┌─────────────────────────────────────────┬─────────────────────────────────────────┐
United States Patent Office 3,661,854
Patented May 9, 1972

---

3,661,854
METHOD FOR PREPARING RANDOM COPOLYMERS OF FORMALDEHYDE AND OLEFIN OXIDES AND/OR VINYL ETHERS
Robert Alton Setterquist, Wilmington, Del., assignor to E. I. du Pont de Nemours and Company, Wilmington, Del.
No Drawing. Filed Feb. 9, 1970, Ser. No. 9,983
Int. Cl. C08g 1/18
U.S. Cl. 260—67 FP                                17 Claims

---

ABSTRACT OF THE DISCLOSURE

Random copolymers of formaldehyde monomer and olefin oxides and/or vinyl ether monomers can be prepared by reacting said monomers at a temperature of from about −20° to about 100° C. in the presence of a perfluoroalkylstibine catalyst having the formula

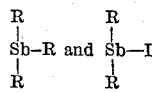

in which R is perfluoroalkyl of from 1–8 carbon atoms.

---

The present invention provides a novel process for the preparation of high molecular weight random copolymers of formaldehyde with olefin oxides and vinyl ethers in the presence of a perfluoroalkylstibine catalyst.

Olefin oxides and vinyl ethers can be copolymerized with formaldehyde in the presence of these perfluoroalkylstibine compounds to yield a high molecular weight oxymethylene copolymer in which the vinyl ethers and olefin oxides are generally randomly distributed throughout the copolymer. In addition, medium molecular weight copolymers suitable for coating compositions also having a random distribution of comonomers can be formed by proper selection of comonomer polymerization temperature and if desired, by the inclusion of a chain transfer agent, e.g. methanol or methyl in the proper amount.

The copolymers formed by this process have a high degree of base stability which is the result of the introduction into the polyoxymethylene chain of olefin oxide and vinyl ether monomer units. Prior art copolymers of formaldehyde and olefin oxides and vinyl ethers made with the usual Lewis acid catalyst such as BF₃, SnBr₄ and the like exhibit a high degree of base stability also, but because of the nature of the catalyst used in preparation, the comonomer unit is introduced into the polymer chain often in succession leading to the formation of short sequences of comonomer units in the chain rather than to the random distribution achieved by use of the present perfluoroalkylstibines. U.S. Patent 3,076,786 describes the preparation of copolymers which are less random than those prepared according to the invention. Random introduction of comonomer units produces a copolymer whose melting point is depressed to a greater degree by the introduction of a given number of the comonomer units, than by an equal number of comonomer units introduced as multiple short sequences by the prior art methods. This allows for a maximum reduction in the melting point of the copolymer to be produced by the minimum introduction of comonomer units. Since a lower melting point often is desirable in an acetal copolymer in order to facilitate moldability and since the comonomer unit often is more expensive than formaldehyde, it is clear that maximum benefit can be obtained at minimum cost by such a process. In addition, the desirable physical properties of the formaldehyde homopolymer are more nearly retained in a random copolymer than in a blocky copolymer for any given number of comonomer units introduced. Furthermore, the more random copolymers lose a lower percentage of their total weight as unstable chain ends during base treatment after polymerization to produce a base-stable product than do the nonrandom or more blocky type of copolymers that contain the same number of comonomer units.

In the presence of the instant novel catalysts, cyclic formals, e.g. dioxolane, are not readily copolymerized with formaldehyde. This is a further distinguishing feature of the catalysts over the common Lewis acids which generally are active catalysts for the homo- and copolymerization of cyclic formals.

The random copolymers of this invention are produced by reacting formaldehyde and a comonomer at a temperature of from about −20° C. to about 100° C. in the presence of a perfluoroalkylstibine catalyst having the formulas

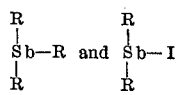

in which R is perfluoroalkyl of from 1 to 8 carbon atoms and preferably from 1 to 4 carbon atoms. Dialkylstibine and trialkylstibine will not initiate copolymerization of formaldehyde and the comonomers described in this invention although they may be used to produce homopolymers of formaldehyde as described in U.S. Patent 2,828,286.

The catalysts of this invention are mildly pyrophoric and are adversely affected by low concentrations of oxygen. Therefore, best results are generally obtained when precautions are taken to exclude oxygen from the polymerization system.

The upper limit of catalyst concentrations is set practically by economic consideration which for a conventional polymerization would be less than about 2,000 parts per million based on the polymerization medium. The lower limit is about 10 parts per million. The preferred operating range is from about 30 to 500 parts per million of catalyst in a liquid polymerization medium.

The preferred comonomers for this formaldehyde copolymerization are olefin oxides having the formula

where R' is H, alkyl of 1 to 8 carbon atoms, alkylene of 2 to 4 carbon atoms cycloalkenyl group of from 6 to 12 carbon atoms, aryl of 6 to 10 carbon atoms, —CH₂—O—R where R is alkyl of 1 to 4 carbon atoms or alkylene of 2 to 4 carbon atoms, —CH₂—X where X is Cl or Br, —CH₂—(CH₂)ₙ—COOR where n is 0–8 and R is alkyl from 1–4 carbon atoms, —CH₂—O—COR where R is alkyl of 1–4 carbon atoms and alkylene of 2–4 carbon atoms,

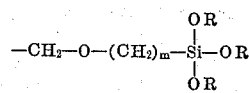

where m is 3 or 4 and R is alkyl of from 1–4 carbon atoms or aryl of 6–10 carbon atoms and the R's may be alike or different, and

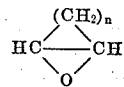

where n=3–6 and vinyl ethers having the formula CH₂=CHOA where A is alkyl of 1–8 carbon atoms, aryl of 6–10 carbon atoms, alkaryl of 7–10 carbon atoms,

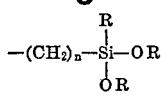

where n is 2–4 and R is from 1–4 carbon atoms and the R's may be alike or different. The following list provides examples of preferred comonomers.

EXAMPLES OF PREFERRED COMONOMERS ethylene oxide
propylene oxide
1,2-butylene oxide
styrene oxide
cyclohexene oxide
epibromohydrin
epichlorohydrin
gamma-glycidoxypropyltrimethoxy silane
glycidyl methyl ether
allyl glycidyl ether
glycidyl phenyl ether
β-(diethoxymethylsilyl)ethyl vinyl ether
methyl vinyl ether
ethyl vinyl ether
n-butyl vinyl ether
dihydropyran
butadiene monoepoxide
4-vinyl-1,2-cyclohexene oxide From 0.05 to about 10 mole percent of the comonomer, based upon the moles of formaldehyde, of the olefin oxide or vinyl ether is employed in this invention. The preferred range is about 0.2 to 2.0 mole percent.

The monomers employed in the present process should be substantially pure and anhydrous, i.e., in the case of formaldehyde it should contain less than a total of about 1% by weight of substances that can react with formaldehyde or interfere with its polymerization. When high molecular weight products are desired, the formaldehyde should contain no more than about 0.2% of such substances. Methods for obtaining formaldehyde of the required purity are known. The olefin oxides and vinyl ethers should be substantially free from protonic impurities. If desired, the molecular weight of the copolymers may be regulated by the addition of a small amount of chain transfer agent such as methylal or methanol.

The copolymerization may be conducted in any medium in which the formaldehyde and the comonomer may be intimately contacted in the presence of the catalyst provided that the medium does not react with the monomers or polymer and does not excessively deactivate the catalyst. When the medium is a liquid, it should be anhydrous for best results. It can be either flammable or inflammable as for example heptane, hexane, cyclohexane, benzene, toluene, ethylbenzene, methylene chloride, chloroform, carbon tetrachloride, 1,2-dichloroethene, trichloroethene, tetrachloroethene (perchloroethylene), chlorobenzene, o-dichlorobenzene and m-dichlorobenzene or mixtures thereof. If desired, the copolymerization may be carried out in the absence of a liquid medium as for example in a fluidized bed or in an inert gas.

The reaction can be conducted at a temperature of from about −20° C. to about 100° C. The preferred temperature range is from about 20° C. to about 80° C.

The copolymers produced by the process of this invention exhibit substantial base stability, a medium or high molecular weight and a melting point lower than that of the polyoxymethylene homopolymer of similar molecular weight. The inherent viscosities measured in phenol range from about 0.3 to 0.7 for the medium molecular weight copolymers and are generally above 0.7 for the high molecular weight copolymers. Inherent viscosities are conveniently measured in either of two solvents, phenol or hexafluoroisopropyl alcohol. In the case of phenol, the inherent viscosity is measured at 90° C. on a solution of 0.5 gram of polymer in 100 ml. of phenol. In the case of hexafluoroisopropyl alcohol, the inherent viscosity is measured at 35° C. on a solution of 0.5 gram of polymer in 100 ml. of hexafluoroisopropyl alcohol containing one gram of diphenylamine. The relationship between inherent viscosities of these copolymers as measured in these two systems is such that the inherent viscosity in hexafluoroiopropyl alcohol is equivalent to about 1.44 times the inherent viscosity measured in phenol. The formula for inherent viscosity is that reported by L. H. Cragg in "Journal of Colloid Science," volume 1, pages 261–9 (May 1946) and is well known.

The analysis for the number of vinyl ether or olefin oxide units in the copolymer is accomplished by nuclear magnetic resonance or by chemical analysis.

Due to the presence of a comonomer unit containing carbon-carbon linkages, the products of the present invention exhibit substantial base stability which stability may be determined by dissolving approximately 2 grams (weighed to the nearest 0.01 gram) of polymer under a nitrogen blanket in 50 ml. of benzyl alcohol containing 1% by weight potassium hydroxide and heating the solution at 165° C. for 40 minutes. Following the heating, the solution is cooled to 25° C. and the precipitated polymer is collected on a filter, washed six times with 100 ml. of a 3–1 mixture of methanol and water, three times with 100 ml. portions of acetone, and dried under vacuum at 70° C. for 16 hours. Base stability is expressed as a percentage of the original polymer remaining after treatment.

The melting point of the copolymers of the present invention is determined by differential thermal analysis according to the general method in the chapter "Applications of Differential Thermal Analysis to High Polymers," Organic Analysis, vol. IV, page 361, Interscience Publishers, Inc. (1960). A Du Pont Model 900 Differential Thermal Analyzer is adjusted to a heating rate of 10° C. per minute using glass beads as a reference and a sample of polymer is placed in a capillary tube 1.5 to 2.0 mm. in diameter and 2.5 cm. in length which is maintained under a nitrogen blanket. The polymer is heated to 15° C. above its original melting point following which it is cooled approximately five minutes until it reaches a temperature of about 130° C. whereupon the sample is reheated and the melting point is observed. The base stable portion of an etherified polyoxymethylene having an inherent viscosity of 1.0 measured in phenol melts at about 172–174° C. in this test.

The above process has been used to prepare novel copolymers of formaldehyde and compounds having the formula

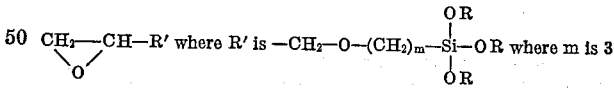

or 4 and R is alkyl of from 1–4 carbon atoms or aryl of from 7–10 carbon atoms and the R's may be alike or different. A specific example of these compounds is the copolymer of formaldehyde and gamma-glycidoxypropyl-trimethoxysilane. These compounds have utility as glass coatings which resist separation of the polymer from the glass after curing or bonding.

The method used for preparing $Sb(CF_3)_3$ was that described by Haszeldine (J. Chem. Soc., 1957, 3708) which consisted of the reaction of trifluoromethyl iodide with antimony pellets at 165–170° for 14 hours at 600 p.s.i. in a steel reactor. In a typical experiment, antimony (100 g.) and trifluoromethyl iodide (100 g.) heated at 165° C. for 14 hours gave a mixture which was washed from the reactor with 100 ml. of toluene and distilled to yield 17 g. of pure $Sb(CF_3)_3$ B.P. 72–75° C. Removal of the toluene and vacuum distillation gave 3 g. of bis(trifluoromethyl) iodostibine (B.P.=120° C.). The solid residue remaining in the reactor consisted of unreacted antimony metal and $SbI_3$.

$Sb(C_2F_5)_3$ was prepared using the method described above. 98 g. of perfluoroethyl iodide was reacted with 100 g. of antimony pellets (⅛″) at 165° C. for 14 hours at 600 p.s.i. At the end of the reaction period the reactor was cooled and the crude product (42 g.) was removed under nitrogen. Distillation of the crude product gave 14.3 g. of tris-perfluoroethylstibine boiling at 46° C. at 62 mm. pressure. This catalyst was used for the copolymerization of formaldehyde and propylene oxide according to Example 14.

$Sb(C_7F_{15})_3$ was prepared as follows: into a 35 cc. heavy-walled ¾″ tube was placed 8.1 g. of antimony metal. The tube was stoppered with a septum stopper, evacuated and purged with nitrogen and 41.9 g. of freshly distilled perfluoroheptyl iodide pressured into the tube through 19 gage stainless steel tubing. The heavy walled tube was capped with a neoprene lined crown cap, evacuated and purged with nitrogen. The tube was placed in a vessel, pressured to 25 p.s.i. with nitrogen and the assembly placed in an oil bath at 165° C. After 6 hours with intermittent shaking the tube was removed from the oil bath, cooled and the product slurry transferred to a distillation flask.

Unreacted perfluoroheptyl iodide (11.5 cc.) boiling at 35° C. at 6 mm. pressure was removed by distillation through an 18″ x ½″ spinning band column. The spinning band column was replaced with a simple still head and the trisperfluoroheptylstibine boiling at 110° C. at 0.5 mm. was distilled from unreacted antimony and $SbI_3$ remaining in the distillation flask. There was obtained 1.86 g. of product. Analysis of the product by nuclear magnetic resonance as a 10% solution in carbon tetrachloride showed fluorine absorption typical of —$CF_2$—Sb— compounds.

It will be apparent to one skilled in the art that the copolymerization reaction can be carried out in a continuous manner if desired.

Quantities expressed in the following examples are by weight unless otherwise stated.

EXAMPLES

Example 1

Polymer was prepared according to the following technique: Formaldehyde gas was generated by continuously pyrolyzing cyclohexyl hemiformal at approximately 150° C. and directing the pyrolysis vapors to a condenser, the temperature of which was regulated to condense cyclohexanol and water and to permit formaldehyde gas to pass through. The gas was then directed through a series of twelve U tubes approximately one inch in diameter by twelve inches in height which were packed with stainless steel packing and maintained at a temperature of —18° C. by immersing approximately ten inches of the lower portion in an acetone bath cooled with solid carbon dioxide. The $CH_2O$ vapors at the rate of about 1.7 parts/min. were directed into a 500 cc. glass flask, which previously had been purged with $N_2$ to remove $O_2$, equipped with a stirrer, thermocouple probe and septum stoppered injection ports and containing 274 parts of benzene and 1.6 parts of methyl vinyl ether. Approximately one minute after introduction of the formaldehyde gas, 0.1 part of tris-trifluoromethylstibine was added and a continuous flow of methyl vinyl ether gas of approximately 0.1 part/min. was introduced into the formaldehyde stream at the inlet to the reactor. The temperature of the medium was maintained at 25° C. by cooling the reactor in an ice bath. After ten minutes the flow of formaldehyde was stopped and the reactor swept with nitrogen. The product was isolated by filtration and washed on the filter with five 100-part portions of acetone. The washed polymer was dried in a vacuum oven at 25° C. for 64 hours to yield 16.8 parts of dry polymer. Approximately 2.7 parts of the dried polymer was contacted with 52 parts of benzyl alcohol containing 0.5 part of 85% aqueous KOH and heated to 165° C. for 45 minutes with nitrogen agitation following which the solution was cooled to 25° C. and the alcohol removed by suction filtration. The solids remaining were slurried with a 1/1 mixture of methanol and water and the slurry filtered. The polymer recovered was washed five times with methanol to remove unreacted base and dried at 90–100° C. in a vacuum oven under a nitrogen blanket for 4 hours. Approximately 2.1 parts of the polymer charged was recovered. The recovered KOH-base stable polymer had an inherent viscosity of 1.02 (0.5% solution in phenol at 90° C.) and melted at 146° C. by differential thermal analysis. NMR analysis showed the polymer to be a copolymer containing approximately 6 mole percent of ether side groups derived from incorporation of methyl vinyl ether. The copolymer could be molded at 185° C. into a flexible tough film which was almost bubble-free, indicative of good thermal stability.

Example 2

The copolymer was prepared as set forth in Eaxmple 1 except the polymerization was carried out in a 2-liter flask and the formaldehyde gas was fed into a slurry of 8 parts of raw methyl vinyl ether copolymer in 135 parts of heptane containing 0.5 part of methyl vinyl ether. Over the first 14 minutes of the copolymerization, 0.033 part of tris-trifluoromethylstibine catalyst was added to the slurry. Methyl vinyl ether was fed into the formaldehyde inlet to the flask at a rate of 0.08 part/min. Heptane was pumped into the flask at a rate of approximately 4.4 parts/min. The temperature of the polymerization slurry was maintained at 50° C. for 140 minutes. Uptake of $CH_2O$ was essentially complete during this period. After this period the formaldehyde flow was stopped and the reactor swept with nitrogen for 2 minutes and 10 parts of tripropylamine added to quench the catalyst. The polymer was recovered by filtration and washed with five 500-part portions of acetone. There were recovered 308.5 parts crude polymer after drying in a vacuum oven at 25° C. for 72 hours. The dry copolymer had a KOH base-stable fraction of 75%, an inherent viscosity measured as a 0.5% solution in hexafluoroisopropyl alcohol at 35° C. of 1.35, and a melting point of 164.5° C. which was 8.5° C. lower than the melting point of a sample of acetylated polyoxymethylene homopolymer made with a quaternary ammonium catalyst. Nuclear magnetic resonance analysis of the base-stable copolymer showed 1 mole percent

—$CH_2$—$CH_2$— groups from the methyl vinyl ether interspersed in the copolymer.

Example 3

The copolymer was prepared as set forth in Example 1 except the polymerization was carried out in trichloroethylene medium and ethylene oxide was used as a comonomer. The formaldehyde was fed at a rate of approximately 1.6 part/min. into a reactor containing 366 parts of trichloroethylene and 4.8 parts of ethylene oxide. After approximately 2 minutes, 0.1 part of tris-trifluoromethylstibine in 8.6 parts of toluene was added to the reaction mixture which was maintained at 40° C. Ethylene oxide was introduced into the formaldehyde entering the reactor at a rate of 0.1 part/min. After 8 minutes, the formaldehyde flow to the reactor was stopped and the reactor swept with nitrogen. After 5 minutes, 2 parts of tributylamine was added to quench the catalyst. The polymer was isolated by filtration, washed 5 times with 100-part portions of methanol and dried in a vacuum oven for 16 hours at 60° C. There was recovered 15.5 grams of white polymer which had a KOH base-stable fraction of 81.6% and an inherent viscosity of 1.07 (measured on a 0.5% solution of polymer in phenol at 90° C.). The base-stable copolymer melted 6.3° C. lower than an acetylated polyoxymethylene homopolymer. Chemical analysis of the base-stable copolymer showed the copolymer to contain approximately 1.9 mole percent —$CH_2$—$CH_2$— groups incorporated.

Example 4

The copolymer was prepared as set forth in Example 1 except the polymerization was carried out in a 1/1 benzene-heptane medium and propylene oxide was used as a conmonomer. Formaldehyde purified by passage through twelve U traps at 0° C. was fed at a rate of approximately 1.0 part/min. into a reactor containing 35 parts of heptane, 44 parts of benzene and 4.1 parts of propylene oxide. After 2 minutes, 12 minutes and 22 minutes, 0.2 part of tris-trifluoromethylstibine was added to the reactor. Heptane was added at a rate of 3.5 parts/min., benzene was added at a rate of 4.5 parts/min., propylene oxide was added at a rate of 0.41 part/min., and tris-trifluoromethylstibine at a rate of 0.004 part/min. The temperature of the stirred slurry was maintained at approximately 43° C. during the run. After 60 minutes the flow of formaldehyde was stopped and the reactor swept with nitrogen. After 5 minutes 7.8 parts of tributylamine was added to quench the catalyst. The polymer was isolated by filtration, washed 5 times with 100-part portions of methanol, and dried in a vacuum oven at 40° C. for 18 hours. There was obtained 47 parts of crude copolymer which had a KOH base-stability of 77% and an inherent viscosity measured as a 0.5% solution in hexafluoroisopropyl alcohol at 35° C. of 1.32. The copolymer melted 10.1° C. lower than an acetylated polyoxymethylene homopolymer of approximately the same molecular weight. Nuclear magnetic resonance analysis of the base-stable copolymer showed 3.0 mole percent

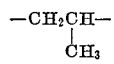

groups derived from the propylene oxide incorporated in the copolymer.

Example 5

The copolymer was prepared as set forth in Example 1 except trichloroethylene was used as a polymerization medium and methyl glycidyl ether was used as a comonomer. Formaldehyde purified by passage through three 1" x 12" U traps at 0° C. was directed at the rate of about 1.0 part/min. into a reactor containing 365 parts of trichlorethylene and 6 parts of methyl glycidyl ether. After 2 minutes, 0.03 part of tristrifluoromethylstibine in 0.24 part of toluene was added to the reactor, and the temperature of the slurry was maintained at 35° C. during the polymerization. After 10 minutes, the flow of formaldehyde to the reactor was stopped and the reactor swept with nitrogen for 5 minutes. The catalyst was neutralized with 10 parts of 28% aqueous ammonium hydroxide and the slurry filtered to separate the polymer. The white polymer which collected on the filter was washed with five 100-part portions of acetone and dried in a vacuum oven at 60° C. for 16 hours. There were obtained 9.5 parts of crude copolymer which had a tributylamine base stability of 62.9%. The base-stable fraction had an inherent viscosity measured as a 0.5% solution in hexafluoroisopropyl alcohol at 35° C. of 1.92 and melted 4° C. lower than an acetylated homopolymer of approximately equal molecular weight. Analysis by nuclear magnetic resonance techniques showed the basestabe fraction to contain 0.2 mole percent

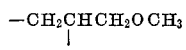

groups in the copolymer.

Example 6

The copolymer was prepared as set forth in Example 5 except that 7 parts of epichlorohydrin was used as a comonomer. The quantity of trichloroethylene, time and conditions of the reaction remained the same as in Example 5. There were obtained 7.6 parts of crude product which had a KOH base stability of 46.9%. The base-stable fraction obtained by treatment of 2 parts of crude polymer with 2 parts of tributylamine in 50 parts of benzyl alcohol at 165° C. for 45 minutes was found to be 48.2% and contained 1.28% chlorine. The amine base-stable copolymer melted 2.2° C. lower than an acetylated homopolymer of similar molecular weight. The base-stable fraction had an inherent viscosity measured in hexafluoroisopropyl alcohol of 1.98.

Example 7

The copolymer was prepared as set forth in Example 6 except that 10 parts of epibromohydrin was used as a comonomer, 365 parts of trichloroethylene was used as a polymerization medium, and the amount of tris-trifluoromethylstibine catalyst used as initiator was 0.05 part. The polymerization was run for 15 minutes at 35° C. and the polymer recovered in the same fashion as in Example 6. The crude product had a tributylamine base stability of 47%. The base-stable copolymer had an inherent viscosity measured in hexafluoroisopropyl alcohol of 1.35 and melted 1.5° C. lower than an acetal homopolymer of approximately the same molecular weight. Analysis of the base-stable copolymer recovered from the tributylamine treatment showed 1.08 weight percent bromine.

Example 8

The copolymer was prepared as set forth in Example 5 except methyl 10,11-epoxyundecanoate was used as a comonomer. Formaldehyde was fed to a reactor containing 365 parts of trichloroethylene and 10 parts of methyl 10,11-epoxyundecanoate. After 2 minutes, 0.03 part of tris-trifluoromethylstibine in 0.24 part of benzene was added to initiate the polymerization. The temperature was maintained at 25° C. After 10 minutes the formaldehyde flow to the reactor was stopped and the reactor swept with nitrogen for 5 minutes. The slurry was made basic with 10 parts of 28% ammonium hydroxide and filtered. The crude polymer which collected on the filter was washed with five 100-part portions of acetone and dried at 60° C. for 16 hours in a vacuum oven. There was obtained 11.0 parts of dried copolymer which had a tributylamine base stability of 17.4% and an inherent viscosity measured as a 0.5% solution in rexafluoroisopropyl alcohol at 35° C. of 1.28.

Example 9

The copolymer was prepared as set forth in Example 1 except trichloroethylene was used as a polymerization medium and styrene oxide was used as a comonomer. Formaldehyde was directed into a reactor containing 365 parts of trichloroethylene and 8 parts of styrene oxide. After 2 minutes, 0.1 gram of tris-trifluoromethylstibine was added to initiate the polymerization. The temperature of the reaction mixture was maintained at 40° C. After 10 minutes, the flow of formaldehyde to the reactor was stopped and the reactor swept with nitrogen for 5 minutes. The mixture was made basic by the addition of 2 parts of tributylamine and the polymer separated by filtration. The crude polymer recovered on the filter was washed five times with 100-part portions of acetone and dried in a vacuum oven for 10 hours at 60° C. There was recovered 11.9 parts of white copolymer having a base stability (KOH) of 69.9% and an inherent viscosity measured on a 0.5% solution o fthe base-stable fraction in hexafluoroisopropyl alcohol at 35° C. of 0.45.

Example 10

The copolymer was prepared as set forth in Example 5 except that gamma-glycidoxypropyltrimethoxysilane was used as the comonomer. Formaldehyde was directed into a reactor containing 365 parts of trichloroethylene and 10 parts of gamma-glycidoxypropyltrimethoxysilane. After 2 minutes, 0.05 part of tris-trifluoromethylstibine dissolved in 0.48 part of toluene was added to initiate the polymerization. The temperature of the polymerization medium was maintained at 35° C. After 10 minutes, the formaldehyde was stopped and nitrogen swept through the reactor for 5 minutes. The reaction slurry was made basic by the addition of 2 parts of tributylamine. The polymer was separated by filtration of the reaction mixture, washed five times with 100-part portions of methanol and dried in a vacuum oven for 4 hours at 80° C. There was recovered 13.1 parts of crude polymer which had a tripropylamine base stability of 31.6% and an inherent viscosity measured on a 0.5% solution of the crude polymer in hexafluoroisopropyl alcohol at 35° C. of 1.92. The copolymer melted 7° C. lower than an acetylated acetal homopolymer of approximately the same molecular weight.

Example 11

The copolymer was prepared as set forth in Example 1 except tris-perfluoroheptylstibine was used as an initiator, propylene oxide was used as a comonomer and heptane was used as the polymerization medium. Formaldehyde was passed into a reactor containing 200 parts of heptane and 12.5 parts of propylene oxide. After 2 minutes, 0.09 gram of tris-perfluoroheptylstibine dissolved in 1.6 parts of carbon tetrachloride was added to the reactor to initiate the polymerization. The temperature was maintained at 40° C. during the formaldehyde addition. After 10 minutes, the formaldehyde flow was stopped, the reactor swept with nitrogen and the medium in the reactor made basic by the addition of 2 parts of tributylamine. The slurry was filtered and the polymer which collected on the filter washed five times with 100-part portions of methanol. The crude polymer on the filter was placed in a vacuum oven to dry for 16 hours at 40° C. There was recovered 11.1 parts of dry copolymer having a base stability of 48.0% and an inherent viscosity measured on a 0.5% solution of the base-stable fraction in hexafluoroisopropyl alcohol at 35° C. of 2.58.

Example 12

The copolymer was prepared as set forth in Example 5 except that allyl glycidyl ether was used as the comonomer. Formaldehyde purified by passage through six 1" x 12" U tubes at −18° C. was directed at a rate of 1.5 parts/minute into a reactor containing 880 parts of trichloroethylene and 29 parts of allyl glycidyl ether. After 2 minutes 0.05 part of tris-trifluoromethylstibine dissolved in 0.48 part of toluene was added to initiate the polymerization. The temperature of the polymerization was maintained at 45° C. After 22 minutes another 0.05 part of tris-trifluoromethylstibine dissolved in 0.48 part of toluene was added to the reactor. After 62 minutes the formaldehyde flow was stopped and nitrogen swept through the reactor for 5 minutes. The reaction slurry was made basic by the addition of 10 parts of tributylamine. The crude polymer was separated by filtration of the reaction mixture, washed five times with 100-part portions of acetone and dried in a vacuum oven for 16 hours at 80° C., then was recovered 91.0 grams of dry crude copolymer which had a KOH base stability of 58.3%. The inherent viscosity measured on a 0.5% solution of the base stable copolymer in hexafluoroisopropyl alcohol at 35° C. was 1.49. The copolymer melted 3° C. lower than an acetylated homopolymer of approximately the same molecular weight.

The allyl glycidyl ether copolymer could be modified to form a polymer of higher melt viscosity by curing the polymer at 180° C. for 3 minutes in the presence of 1% azo-bis-isobutyronitrile. Curing was performed on 3 parts of polymer which had been coated with 0.03 part of azo-bis-isobutyronitrile dissolved in 24 parts of methanol and then dried at 25° C. under vacuum for 16 hours.

The allyl glycidyl ether copolymer coated with 1% azo-bis-isobutyronitrile was pressed into a film 0.011" x 4" x 4" by heating the polymer between two sheets of aluminum metal in a hydraulic press heated to 180° C. for a period of 3 minutes. After 3 minutes the heat was removed from the hydraulic press and cooling water applied to the press to cool the film to 25° C. The cured film was insoluble in hexafluoroisopropyl alcohol. The melt flow number of the copolymer decreased from a value of 2.5 grams/ 10 minutes before curing to 0.05 gram/10 minutes after curing.

Example 13

The copolymer was prepared as set forth in Example 5 except that cyclohexene oxide was used as the comonomer. Formaldehyde purified by passage through six 1" x 12" U tubes at −18° C. was directed at a rate of approximately 1 part/minute into a reactor containing 366 parts of trichloroethylene and 12 parts of cyclohexene oxide. After 2 minutes 0.05 part of tris-trifluoromethylstibine dissolved in 0.48 part of toluene was added to initiate the polymerization. The temperature was maintained at 35° C. After 15 minutes the flow of formaldehyde to the reactor was stopped and nitrogen swept through the reactor for 5 minutes. The reaction slurry was made basic by the addition of 5 parts of tributylamine. The crude copolymer was separated by filtration of the reaction mixture, washed on the filter with five 100-part portions of acetone and dried in a vacuum oven at 40° C. for 16 hours. There was recovered 37.3 parts of dry polymer. The dry polymer had an inherent viscosity of 2.05 measured in hexafluoroisopropyl alcohol at 35° C. The copolymer had a KOH base stability of 73.6%. The base stabilized copolymer melted 12° C. lower than an acetylated polyoxymethylene homopolymer of the same molecular weight. Flexible colorless, bubble-free films were formed by compression molding the copolymer at 180° C.

Example 14

The copolymer was prepared as set forth in Example 5 except tris-pentrafluoroethylstibine was used as a catalyst, propylene oxide was used as a comonomer and trichloroethylene was used as the polymerization medium. Formaldehyde was passed at a rate of 1.7 parts/minute into a reactor containing 366 parts of trichloroethylene and 5 parts of propylene oxide. After 2 minutes, 0.5 part of tris-pentafluoroethylstibine was added to initaite the polymerization. The temperature of the stirred slurry was maintained at 35° C. After 10 minutes the formaldehyde flow to the reactor was stopped and the reactor swept with N₂. The reaction slurry was made basic by the addition of 5 parts of tributylamine. The crude copolymer was separated by filtration of the reaction mixture, washed on the filter with five 100-part portions of acetone and dried in a vacuum oven at 40° C. for 72 hours. There was recovered 16.6 parts of dry copolymer having a KOH base stability of 49.7% and an inherent viscosity on the base stable fraction of 1.40 measured in hexafluoroisopropyl alcohol at 35° C.

Example 15

The copolymer was prepared as set forth in Example 5 except propylene oxide was used as the comonomer, bis(trifluoromethyl)-iodostibine was used as the catalyst and toluene was used as the polymerization medium. Formaldehyde was passed at a rate of approximately 0.5 part/minute through twelve 1" x 13" U tubes at −18° C. into a reactor containing 260 parts of toluene and 10 parts of propylene oxide. After 2 minutes 0.1 part of bis(trifluoromethyl)-iodostibine was added to initiate the polymerization. The temperature of the stirred slurry in the reactor was maintained at 40° C. After 15 minutes the flow of formaldehyde to the reactor was stopped and the reactor swept with nitrogen for 5 minutes. The reaction mixture was made basic by the addition of 2 parts of tributylamine. The crude polymer was separated by filtration of the reaction mixture, washed with five 100-part portions of acetone and dried under vacuum for 2 hours at 70° C. There was recovered 8.8 parts of dry polymer having a KOH base stability of 85.4%. The inherent viscosity of the base stabilized copolymer was 1.04 measured in hexafluoroisopropyl alcohol at 35° C. The copolymer melted 9° C. lower than an acetylated poly-

Example 16

Formaldehyde was generated by pyrolysis of cyclohexyl hemiformal at 145° C. The product vapors were directed through a condenser maintained at 16° C., then through a U tube approximately one inch in diameter by twelve inches in height containing a small amount of mineral oil at 25° C. at the bottom of the tube which acts as a bubble flow indicator. The formaldehyde was then directed into thirteen additional U traps packed with stainless steel. The first U tube was at 25° C. and the remaining twelve were at 0° C. The U tubes removed water, formic acid, and cyclohexanol.

The purified formaldehye vapor was passed at a rate of about 1.1 parts/minute into a reactor containing 264 parts of benzene, one part of β-(diethoxymethylsilyl) ethyl vinyl ether and 0.09 part of tris-perfluoromethylstibine. The polymerization proceeded at 35° C. after a 3-minute induction period. Additional one-part amounts of β(diethyoxymethylsilyl)ethyl vinyl ether were added at 8 and 14 minutes into the run. Formaldehyde addition was continued for a total of 19 minutes. The reaction was then stirred under nitrogen for four minutes and quenched with 4 parts of triethylamine in 16 parts of methanol. The crude copolymer was recovered by filtration, washed with three 250-part portions of acetone and dried in a vacuum oven at 25° C. to yield 24.2 parts of product. The copolymer had an inherent viscosity of 1.36 in hexafluoroisopropyl alcohol (35° C.).

The copolymer product was stabilized by solution ester capping. Three grams of crude product was mixed with 54 parts of propionic anhydride and 6 parts of quinoline and stirred under nitrogen for 30 minutes. The polymer was then taken into solution at 168° C. and cooled. The precipitated polymer was collected by filtration and washed with three portions of 75% acetone-25% methanol followed by two portions of acetone. The product was quantitatively recovered after vacuum drying overnight. The copolymer had a melting point of 167° C. as determined by the differential thermal analysis. Its was determined by NMR measurements that approximately 1.0 mole percent of the comonomer had been incorporated into the main chains of the copolymer.

Example 17

The polymer was prepared as set forth in Example 5 except that propylene oxide was used as a comonomer and ortho-dichlorobenzene was used as a polymerization medium. Formaldehyde purified by passage through twelve 1" x 12" U tubes at −18° C. was directed at a rate of 0.8 part/minute into a reactor containing 390 parts of ortho-dichlorobenzene and 6.6 parts of propylene oxide. After 2 minutes 0.05 part of tris-trifluoromethylstibine dissolved in 0.48 part of toluene was added to the reactor to initiate the polymerization. The temperature of the stirred slurry was maintained at 25° C. After 10 minutes the flow of formaldehyde to the reactor was stopped and nitrogen swept through the reactor for five minutes. The flow of ethylene oxide was stopped and the reaction slurry was made basic by the addition of 2 parts of tributylamine. The crude copolymer was separated by filtration of the reaction mixture, washed on the filter with five 100-part portions of methanol and dried in a vacuum oven for 18 hours. There was recovered 7.71 parts of dry polymer. The dry polymer had a KOH base stability of 82.1% and an inherent viscosity of 7.19 measured in hexafluoroisopropyl at 35° C. The base stable fraction of the copolymer melted 8.3° C. lower than an acetylated homopolymer of the same molecular weight.

Example 18

The copolymer was prepared as set forth in Example 5 except ethylene oxide was used as a comonomer and chlorobenzene was used as the polymerization medium. Formaldehyde purified by passage through three 1" x 12" U tubes at 0° C. was passed at a rate of 1.4 parts per minute into a reactor containing 330 parts of chlorobenzene. Ethylene oxide gas was passed at a rate of 0.1 part/minute into the formaldehyde stream as it entered the reactor. After 1 minute, 5 parts of liquified ethylene oxide was added to the reactor. One minute later 0.03 part of tris-trifluoromethylstibine dissolved in 0.26 part of toluene was added to initiate the polymerization. The temperature of the stirred reactor slurry was maintained at 40° C. After 10 minutes the formaldehyde flow to the reactor was stopped and the reactor swept with nitrogen for 4 minutes. The reaction mixture was diluted with 100 parts of methanol. The crude polymer separated from the reaction mixture by filtration and washed on the filter with five 100-part portions of methanol. The polymer was dried under vacuum for 16 hours at 70° C. There was obtained 8.2 parts of dry polymer having a KOH base stability of 47.5%. The base-stable fraction of the copolymer had an inherent visocsity of 1.72 measured in hexafluoroisopropyl alcohol at 35° C.

Example 19

The copolymer was prepared as set forth in Example 5 except propylene oxide was used as a comonomer and methylene chloride was used as a polymerization medium. Formaldehyde purified by passage through 1" x 12" tubes at −18° C. was passed at a rate of 0.9 part/minute into a reactor containing 267 parts of methylene chloride and 8.3 parts of propylene oxide. After 2 minutes 0.2 part of neat tris-trifluoromethylstibine was added to initiate the copolymerization. The temperature of the reaction slurry was maintained at 30° C. After 10 minutes the flow of formaldehyde to the reactor was stopped and the reactor swept with nitrogen for five minutes. The crude polymer was separated from the reaction mixture by filtration and washed on the filter five times with 100-part portions of acetone. The copolymer was dried in a vacuum oven for 16 hours at 40° C. There was recovered 7.7 parts of dry copolymer having a KOH base stability of 87.5%. The base-stable fraction of the copolymer had an inherent viscosity of 1.61 in hexafluoroisopropyl alcohol at 35° C. and melted 13.3° C. lower than an acetylated homopolymer of the same molecular weight. The number average molecular weight of the copolymer determined by membrane osmometry was 39,300.

Example 20

The polymer was prepared as set forth in Example 5 except epibromohydrin and propylene oxide were used as comonomers. Formaldehyde purified by passage through 3 U traps at −18° C. was passed into a reactor containing 15 parts of epibromohydrin, 2.5 parts of propylene oxide and 365 parts of trichloroethylene. After 2 minutes 0.1 part of tris-trifluoromethylstibine in 0.48 part of toluene was added to the reactor. The temperature of the slurry was maintained at 35° C. during the polymerization. After 20 minutes a solution of 15 parts of epibromohydrin, 2.5 parts of propylene oxide and 365 parts of trichloroethylene were fed to the reactor at a rate of 10 parts/min. The polymerization was continued for 40 min. and the formaldehyde flow to the reactor stopped. The reactor was swept with nitrogen for 5 minutes and 5 parts of tributylamine were added to neutralize the catalyst. The polymer was isolated by filtration and the white polymer which collected on the filter was washed with 5–300 ml. portions of acetone and dried in a vacuum oven at 40° C. for 18 hours. There was recovered 84.2 parts of crude polymer. The crude polymer exhibited a tributylamine base stability of 71.9% and had an inherent viscosity measured in hexafluoroisopropanol of 0.98. Analysis of the tributylamine stabilized fraction of the propylene oxide-epibromohydrin-formaldehyde terpolymer showed 0.59% bromine.

The terpolymer was modified by treating 82 parts of crude terpolymer with 1000 parts of benzyl alcohol containing 50 parts of tributylamine at 165° C. for 45 minutes to hydrolyze the groups from the polymer. The modified terpolymer contained less than 25 p.p.m. bromine by analysis indicating essentially all of the bromine atoms had been substituted by —OH groups producing a terpolymer of formaldehyde and propylene oxide having interspersed $$-CH_2CH- \atop \phantom{-}CH_2OH$$

groups. The allyl alcohol-propylene oxide-formaldehyde tempolymer melted 2.5° lower than an acetalated polyoxymethylene homopolymer of the same molecular weight and had an inherent viscosity measured in hexafluoroisopropyl alcohol of 0.95. Infrared analysis showed the terpolymer to contain 0.12 mole percent —OH.

Example 21

The copolymer was prepared as set forth in Example 1 except heptane was used as a comonomer and trisperfluoroheptylstibine was used as a catalyst. Formaldehyde purified by passage through 12 U traps cooled to $-18°$ C. was passed at a rate of approximately 1.6 part/min. into a polymerization vessel containing 205 parts of heptane and 12.5 parts of propylene oxide. After 2 min. 0.09 part of tris-perfluoroheptylstibine in 1.6 parts of carbon tetrachloride was added to the polymerization reactor. The temperature of the reaction was maintained at 40° C. After 10 minutes the formaldehyde flow was stopped and the reactor swept with nitrogen for 10 minutes. The reaction slurry was made basic by the addition of 2 parts of tributylamine and the polymer separated by filtration, washed with five 100-part portions of methanol and dried in a vacuum oven at 40° C. for 16 hours. There was recovered 11.1 parts of dry copolymer having a base stability measured with KOH of 48% and an inherent viscosity measured in hexafluoroisopropyl alcohol at 35° C. of 2.58.

I claim:

1. A process for producing base stable copolymers of formaldehyde monomer and at least one other monomer selected from the group of monomers consisting of (a) oxides having the formula $$\underset{O}{CH_2\!-\!\!CH\!-\!R'}$$

wherein $R^1$ is H, alkyl of 1-8 carbon atoms, alkylene of 2-4 carbon atoms, cycloalkenyl group of from 6-12 carbon, aryl of 6-10 carbon atoms; —CH$_2$—O—R where R is alkyl of 1-4 carbon atoms or alkylene of 2-4 carbon atoms; —CH$_2$—X where X is Cl or Br;

—CH$_2$—(CH$_2$)$_n$—COOR where $n$ is 0-8 and R is alkyl of 1-4 carbon atoms;

—CH$_2$—O—COR where R is alkyl of 1-4 carbon atoms or alkylene of 2-4 carbon atoms, and $$\underset{O}{HC\!\!\overset{(CH_2)_n}{\diagup\!\!\diagdown}\!\!CH}$$

where $n=3-6$ and (b) vinyl ethers having the formula CH$_2$=CHOA where A is alkyl of 1-8 carbon atoms, aryl of 6-10 carbon atoms, alkaryl of 7-10 carbon atoms; by reacting, at a temperature of from about $-20°$ to about 100° C., said monomers in a polymerization medium in the presence of a perfluoroalkylstibine catalyst selected from the group of perfluoroalkylstibine catalysts having the formula $$\underset{R}{\overset{R}{|}}{Sb\!-\!R} \text{ and } \underset{R}{\overset{R}{|}}{Sb\!-\!I}$$

in which R is perfluoroalkyl of from 1-8 carbon atoms.

2. The process of claim 1 in which the perfluoroalkylstibine catalyst is selected from the group of perfluoroalkylstibine catalysts having the formula $$\underset{R}{\overset{R}{|}}{Sb\!-\!R} \text{ and } \underset{R}{\overset{R}{|}}{Sb\!=\!I}$$

in which R is perfluoroalkyl of from 1-4 carbon atoms.

3. The process of claim 2 in which the perfluoroalkylstibine catalyst is tris-trifluoromethylstibine.

4. The process of claim 3 in which the reaction temperature is from about 20° C. to about 80° C.

5. The process of claim 2 in which the perfluoroalkylstibine catalyst is bis(trifluoromethyl)-iodostibine.

6. The process of claim 5 in which the reaction temperature is from about 20° C. to about 80° C.

7. The process of claim 2 in which the perfluoroalkylstibine catalyst is tri-pentafluoroethylstibine.

8. The process of claim 1 in which the perfluoroalkylstibine catalyst is tris-perfluoroheptylstibine.

9. The process of claim 1 wherein said other monomer is methyl vinyl ether.

10. The process of claim 1 wherein said other monomer is ethylene oxide.

11. The process of claim 1 wherein said other monomer is propylene oxide.

12. The process of claim 1 wherein said other monomer is methyl glycidyl ether.

13. The process of claim 1 wherein said other monomer is epichlorohydrin.

14. The process of claim 1 wherein said other monomer is methyl 10,11-epoxyundecanoate.

15. The process of claim 1 wherein said other monomer is styrene oxide.

16. The process of claim 1 wherein said other monomer is cyclohexene oxide.

17. The process of claim 1 wherein said other monomer is epibromohydrin and propylene oxide.

References Cited

UNITED STATES PATENTS

| | | | |
|---|---|---|---|
| 2,828,286 | 3/1958 | MacDonald | 260—67 FP |
| 3,076,786 | 2/1963 | Brown et al. | 260—73 |
| 3,087,913 | 4/1963 | Kray et al. | 260—73 |
| 3,275,604 | 9/1966 | Kray et al. | 260—67 FP |
| 3,379,655 | 4/1968 | May et al. | 260—67 FP X |
| 3,466,263 | 9/1969 | May et al. | 260—73 |

WILLIAM H. SHORT, Primary Examiner

L. M. PHYNES, Assistant Examiner

U.S. Cl. X.R.

260—73 L